(12) United States Patent
Zhao et al.

(10) Patent No.: US 8,525,970 B2
(45) Date of Patent: Sep. 3, 2013

(54) PHOTO-ALIGNED LIQUID-CRYSTAL MICROPOLARIMETER ARRAY AND ITS MANUFACTURING METHOD

(75) Inventors: Xiaojin Zhao, Hong Kong (CN); Amine Bermak, Hong Kong (CN); Vladimir Grigorievich Chigrinov, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 521 days.

(21) Appl. No.: 12/784,355

(22) Filed: May 20, 2010

(65) Prior Publication Data
US 2010/0296039 A1 Nov. 25, 2010

Related U.S. Application Data

(60) Provisional application No. 61/213,259, filed on May 21, 2009.

(51) Int. Cl.
*G02F 1/13* (2006.01)
(52) U.S. Cl.
USPC ........................................ 349/199
(58) Field of Classification Search
USPC .................................. 349/199, 129
See application file for complete search history.

(56) References Cited

U.S. PATENT DOCUMENTS

| 5,327,285 A | 7/1994 | Faris |
| 7,385,669 B2 | 6/2008 | Wang et al. |
| 7,582,857 B2 * | 9/2009 | Gruev et al. ........... 250/225 |

OTHER PUBLICATIONS

Gruev et al., "Fabrication of a Dual-Tier Thin Film Micro Polarization Array," *Electrical and Systems Engineering Department University of Pennsylvania*, 1-13 (2007).
Guo et al., "Fabrication of thin-film micropolarizer arrays for visible imaging polarimetry," *Applied Optics*, 39(10): 1486-1492 (Apr. 1, 2000).
Harnett et al. "Liquid-crystal micropolarizer array for polarization-difference imaging," *Applied Optics*, 41(7): 1291-1296 (Mar. 1, 2002).
Kalayjian et al., "A Polarization Contrast Retina That Uses Patterned Iodine-Doped PVA Film," *Proceedings of the 22nd European Solid-State Circuits Conference (ESSCIRC '96)* (1996).
Momeni et al. "An Analog VLSI Chip Emulating Polarization Vision of Octopus Retina," *IEEE Transactions on Neural Networks*, 17(1): 222-232 (Jan. 2006).
Xiaojin et al., "High-resolution photoaligned liquid-crystal micropolarizer array for polarization imaging in visible spectrum," *Optics Letters*, 34(23): 3619-3621 (Dec. 1, 2009).
Zhao et al., "A High-Resolution Micro-circular-polarization-analyzer Array for Real-Time Active Circular Polarization Imaging," *IEEE 2009 Biomedical Circuits and Systems Conference*, 49-52 (Nov. 26-28, 2009).
Zhao et al., "Liquid-crystal Micropolarimeter Array for Visible Linear and Circular Polarization Imaging," *IEEE International Symposium on Circuits and Systems (ISCAS)* (Paris, France, 2010).

\* cited by examiner

*Primary Examiner* — James Dudek
(74) *Attorney, Agent, or Firm* — Leydig, Voit & Mayer, Ltd.

(57) ABSTRACT

A micropolarimeter is described for simultaneously extracting all Stokes parameters from incident light. The micropolarimeter includes at least one superpixel, which further includes three or more subpixels, each exact a different polarization components from the incident light. The micropolarimeter includes a first and second alignment layers and a liquid crystal layer disposed between the first and second alignment layers. The liquid crystal molecules of the liquid crystal layer are aligned in accordance with the first and second alignment layers to form the superpixel. A method is provided for manufacturing the photo-aligned liquid-crystal micropolarimeter array.

15 Claims, 11 Drawing Sheets

PHOTO-ALIGNED LIQUID-CRYSTAL MICROPOLARIMETER ARRAY AND ITS MANUFACTURING METHOD

CROSS-REFERENCE TO RELATED APPLICATION

This patent application claims the benefit of U.S. Provisional Patent Application No. 61/213,259, filed May 21, 2009, which is incorporated by reference in its entirety.

FIELD OF THE INVENTION

This invention relates in general to the field of micropolarimeter and in particular to a new micropolarimeter array for simultaneously extracting and analyzing complete polarization information of incident light with arbitrary polarization state and the method for making such.

BACKGROUND OF THE INVENTION

A micropolarimeter is a scientific instrument used to measure the angle of rotation caused by passing polarized light through an optically active substance, such as certain liquid crystal materials. The micropolarimeters are usually utilized in conjunction with image sensors, such as digital cameras, to obtain images showing the polarization components measured by the micropolarimeters.

U.S. Pat. No. 5,327,285 to S. M. Faris discloses several methods of manufacturing micropolarizers, which includes selective bleaching/treating a polyvinyl alcohol (PVA) film with patterned photoresist on top, selective PVA film etching, including chemical etching, photochemical etching, eximer laser etching and reactive ion etching, with patterned photoresist on top, mechanical cutting/milling and electrically controlled liquid-crystal cell with patterned indium tin oxide (ITO) electrodes.

U.S. Pat. No. 7,385,669 B2 to Z. Wang, et al. disclose several methods of creating twisted nematic (TN) polymerizable liquid crystal micropolarizers including: (a) two-step UV exposure; (b) e-field alignment; (c) multi-rubbing and (d) photo-induced alignment. Two LC microdomains are formed, where one is in TN state and the other one is in isotropic state. In the TN state, LC molecules are twisted by 90° and it is optically equal to a polarization rotator; while in the isotropic state, the arrangement of LC molecules is random.

In the non-patent literature, "A polarization contrast retina that uses patterned iodine-doped PVA film," Proceeding of $22^{nd}$ European Solid-State Circuits Conference, pp. 308-311, 1996, Z. K. Kalayjian, et al. demonstrate a micropolarizer fabrication method by patterning iodine-doped PVA film. In there, masking and etching steps are used to undope iodine selectively in regions of PVA. The dichroic effect of said undoped regions is destroyed by removing the iodine from the polymer sheet.

In the non-patent literature, "Fabrication of thin-film micropolarizer arrays for visible imaging polarimetry," Applied Optics, vol. 39, no. 10, pp. 1486-1492, 2000, J. Guo, et al. demonstrate a fabrication method of thin-film micropolarizer arrays. A dichroic dye material is first spin-coated then rubbed to form a thin polarizing film. Reactive ion etching is applied successively to pattern the thin polarizing film.

In the non-patent literature, "Liquid-crystal micropolarizer array for polarization-difference imaging," Applied Optics, vol. 41, no. 7, pp. 1291-1296, 2002, C. K. Harnett, et al. present a liquid-crystal micropolarizer array with evaporated gold film as the orientation layers. Gold is evaporated to LC substrate with predetermined direction and liftoff is used to pattern the gold film. One more LC microdomain needs one more gold evaporation and liftoff. Two LC microdomains are formed with their gold evaporation directions perpendicular to each other.

In the non-patent literature, "An analog VLSI chip emulating polarization vision of octopus retina," IEEE Transactions on Neural Networks, vol. 17, no. 1, pp. 222-232, 2006, M. Momeni, et al. demonstrate a micropolarizer array made of $YVO_4$. An aluminum film is evaporated on top of $YVO_4$ crystal then patterned by liftoff to form the birefringent micropolarizer array.

In the non-patent literature, "Fabrication of a dual-tier thin film micro polarization array," Optics Express, vol. 15, no. 8, pp. 4994-5007, 2007, V. Gruev, et al. demonstrate a dual-tier micropolarizer array for extracting partial linear polarization information. This dual-tier micropolarizer array is formed by successively laminating and etching two PVA layers. The two PVA layers are laminated with a predetermined angle between their polarizing axis orientations.

Previously reported micropolarizers have been generally adequate for their intended applications. However, only linear polarization information is provided by these micropolarizers. Complete polarization information tends to be more complex and its real-time extraction requires simultaneous polarimetries of unpolarized, linearly polarized and circularly polarized components of incident light.

Another disadvantage is the large pixel size of existing micropolarimeters, where high resolution polarization imaging is not possible due to the pixel size mismatch between the micropolarimeter array and the image sensing array of advanced solid-state image sensor.

Furthermore, it is desired to reduce the complexity of the micropolarimeter array fabrication and its compatibility with solid-state image sensor fabrication. With previously reported selective-etching-based methods, the fabrication process of the micropolarimeter array for extracting complete polarization information is extremely complex. In addition, the fabrication compatibility between the micropolarimeter array and the solid-state image sensor is an important factor of the overall manufacturing cost.

SUMMARY OF THE INVENTION

Described herein is a micropolarimeter array for simultaneously extracting and analyzing complete polarization information of incident light with arbitrary polarization state, which can be integrated, for example, with solid-state image sensor for complete polarization imaging in real time.

In general, the micropolarimeter array includes an upper and lower alignment layers and a liquid crystal layer disposed between the alignment layers. The alignment layers have different regions, each of which has a different alignment direction, imparting non-uniform alignments to the liquid crystal molecules within the liquid crystal layer.

In particular, a plurality of regions (i.e., sub-pixels) are formed in the liquid crystal layer, where the liquid crystal molecules within each regions are aligned in a different direction in response to the alignment characteristics of the corresponding regions of the alignment layers, thereby imparting different polarizations onto any light passing through the liquid crystal layer. Light output from each of these regions has a different polarization characteristics.

In one embodiment, at least four regions are formed in the liquid crystal layer, each of which has a different polarization characteristics in accordance with the alignments caused by the alignment layers. When light having different polarization components passes through the micropolarimeter, each region outputs a different polarization component extracted from the incident light. These polarization components can be linearly or circularly polarized.

In some further embodiments, the lower alignment layer is directly fabricated on a image sensor array so that the output light is directed collected by the image sensor array for generating real-time polarization images.

In some alternative embodiments, a method is provided for manufacturing a photo-aligned liquid-crystal micropolarimeter array, consisting of micropolarimeters for simultaneously extracting a plurality of polarization components of incident light. These polarization components can be 0°, 90°, or 45° linearly polarized or right or left-handed circularly polarized.

In general, the method includes forming a first alignment layer having a first photoalignment direction, forming a second alignment layer having three or more non-overlapping regions arranged in a predetermined pattern, wherein each of the three or more regions has a second photoalignment direction different from the second photoalignment directions of the other regions of the second alignment layer, aligning the second alignment layer with the first alignment layer, and disposing a liquid crystal layer between the first and the second alignment layers.

In a further embodiment, the micropolarimeter array is manufactured by providing a first substrate having an inner and an outer surface and a second substrate having an inner and an outer surface; depositing and patterning an ITO layer on each inner surface of said substrates; coating a photo-sensitive dye material on each inner surface of said substrates; then photo-aligning the inner surface of the first substrate along a predetermined orientation and photo-aligning the inner surface of the second substrate with separated masked exposures along orientations having predetermined angles with respect to said predetermined orientation.

The method further includes assembling the substrates with their inner surfaces facing each other and a space between said inner surfaces; filling a liquid crystal material in said space and laminating a polarizing film on the outer surface of the second substrate with its polarizing axis orientation having a predetermined angle with respect to said predetermined orientation.

In still a further embodiment, the liquid-crystal micropolarimeter array can be manufactured on top of a solid-state image sensor for simultaneously extracting and analyzing complete polarization information of input image scenes in real time.

In some alternative embodiment, an apparatus is provided for measuring polarization components of incident light, including a micropolarimeter pixel array having a plurality of pixel, wherein each pixel provides substantially simultaneous measurements of three or more polarization components of the incident light.

In still some alternative embodiment, an apparatus is provided for measuring polarization components of incident light, including a first alignment layer for receiving the incident light having one or more polarization components, the first alignment layer having a first photoalignment direction, a second alignment layer aligned with the first alignment layer for outputting retarded light, the second alignment layer having three or more regions arranged in a predetermined pattern, wherein each of the three or more regions has a second photoalignment direction different from the second photoalignment directions of the other regions of the second alignment layer, and a liquid crystal layer disposed between the first and second alignment layers and aligned by the first and second alignment layers in accordance with the first and second photoalignment directions, wherein the liquid crystal layer imparts different retardations to the incident light so that the retarded light output from each of three or more regions of the second alignment layer has a different polarization component of the incident light.

In still some alternative embodiment, a method is provided for fabricating a micropolarimeter, comprising forming a first alignment layer having a first photoalignment direction, forming a second alignment layer having three or more non-overlapping regions arranged in a predetermined pattern, wherein each of the three or more regions has a second photoalignment direction different from the second photoalignment directions of the other regions of the second alignment layer, aligning the second alignment layer with the first alignment layer; and disposing a liquid crystal layer between the first and the second alignment layers.

DETAILED DESCRIPTION OF THE INVENTION

Light phenomena can be accurately explained by using the notion of electromagnetic field propagating as wave through different media, where the wave vibrates in a direction perpendicular to the propagation direction. The polarization of light is defined as the path traced by the tip of the electric field as the wave propagates: if the path is consistently a line, the light is linearly polarized; if the path is consistently a circle, the light is circularly polarized; and if the path is consistently an ellipse, the light is elliptically polarized. The electric-field vector is usually used to describe the electric-field component of the light, and the orthogonal components of the electric-field vector oscillating in the x-y plane can be expressed as follows:

$$Ex(t)=E0x(t)\cdot\cos[(\omega t+\delta x(t)],\quad\text{(E1)}$$

$$Ey(t)=E0y(t)\cdot\cos[(\omega t+\delta y(t)],\quad\text{(E2)}$$

where $E0x(t)$ and $E0y(t)$ are the instantaneous amplitudes at time t along the x and y coordinates, $\delta x(t)$ and $\delta y(t)$ are the instantaneous phase factors, and $\omega$ is the instantaneous angular frequency.

Stokes parameters (also known as Stokes vector) fully describe all possible polarization states of light and they can be expressed in term of intensity as follows:

$$S0=I(0°,0°)+I(90°,0°),\quad\text{(E3)}$$

$$S1=I(0°,0°)-I(90°,0°),\quad\text{(E4)}$$

$$S2=2\cdot I(45°,0°)-I(0°,0°)-I(90°,0°),\quad\text{(E5)}$$

$$S3=2\cdot I(45°,90°)-I(90°,0°),\quad\text{(E6)}$$

where I(0°,0°) is the light intensity filtered with a 0° linear polarizer, I(90°,0°) is the light intensity filtered with a 90° linear polarizer, I(45°,0°) is the light intensity filtered with a 45° linear polarizer and I(45°,90°) is the light intensity filtered with a quarter wavelength retarder then a 45° linear polarizer. Accordingly, four micropolarimeters are needed to simultaneously measure the Stokes parameters, I(0°,0°), I(90°,0°), I(45°,0°) and I(45°,90°), so that the complete polarization information fully described by Stokes parameters can be readily extracted in real time.

Figure 1:
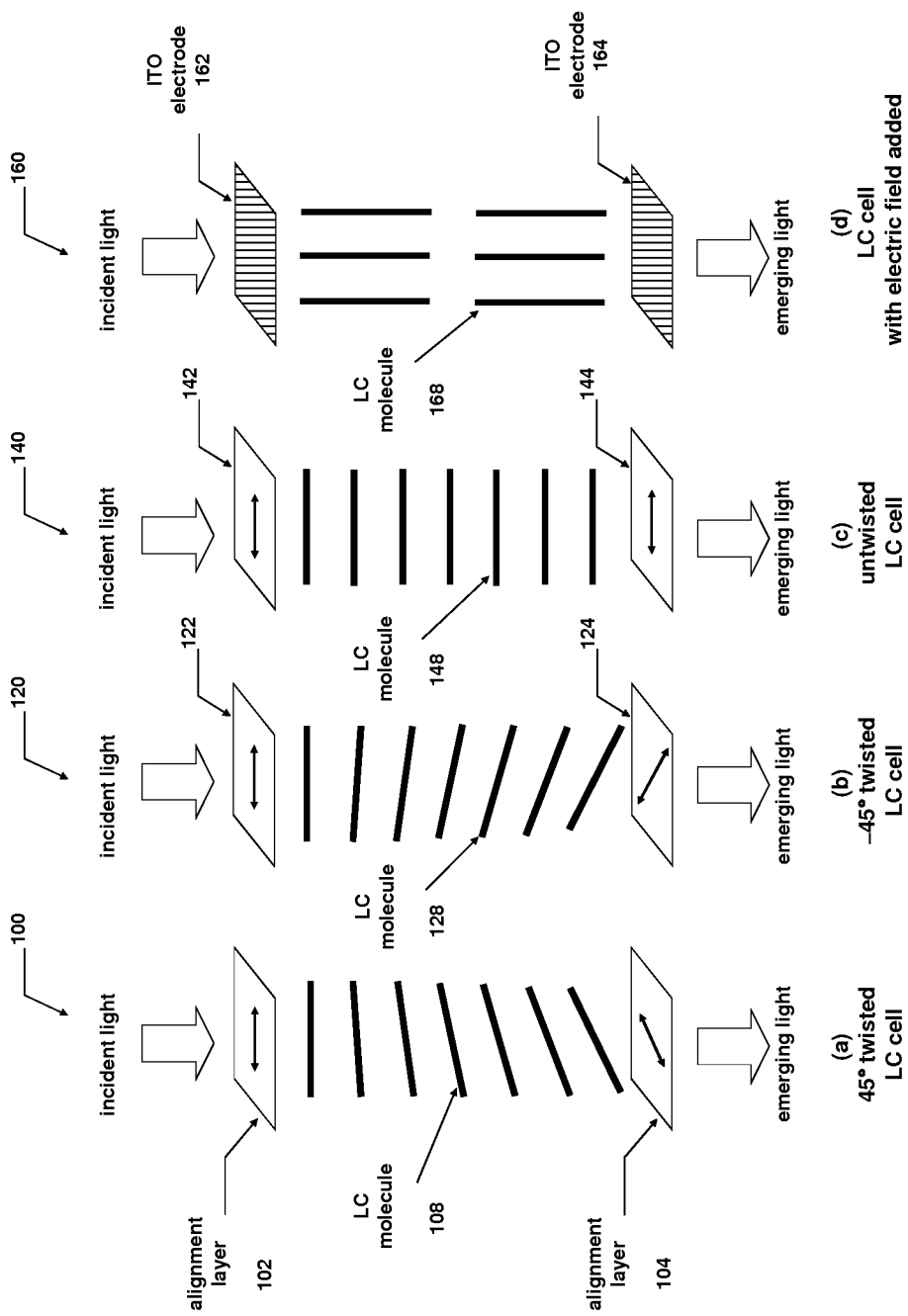
FIG. 1 shows diagrams of four liquid crystal (LC) cells with different LC molecules alignments, where (a) shows a 45° twisted LC cell, (b) shows a −45° twisted LC cell, (c) shows an untwisted LC cell, and (d) shows a LC cell with electric field added.

FIG. 1 illustrates four liquid crystal (LC) cells with different LC molecules arrangements: (a) 45° twisted LC cell 100; (b) –45° (or 135°) twisted LC cell 120; (c) untwisted LC cell 140; (d) LC cell 160 with an electric field added through the Indium Tin Oxide (ITO) electrodes 162 and 166.

In the first LC cells 100 and 120, the LC molecules are oriented by aligning the top layer along a predetermined alignment direction imparted by the alignment layers 102 and 122 and the bottom layer along another direction imparted by the alignment layers 104 and 124. The alignment direction of the bottom layer has a twist angle $\Phi$ with respect to the predetermined alignment direction of the top layer. In LC cell 100, the LC twist angle between the top and bottom layers is 45° and in LC cell 120, the LC twist angle in is –45° (or 135°). The LC cells 100 and 120 are optically equal to polarization rotators and the polarization plane of the incident light can be considered to rotate with the LC molecules by the twist angle $\Phi$ if the Mauguin condition is satisfied:

$$\Delta n\cdot d>>\lambda,\quad\text{(E7)}$$

where $\Delta n$ is the LC birefringence, d is the LC layer thickness and $\lambda$ is the wavelength of the incident light. When –90°<$\Phi$<90°, the LC cell is in low twisted nematic (LTN) mode.

In LC cell 140, the LC molecules are oriented by aligning the top layer along the first predetermined direction and the bottom layer along the same direction as the first predetermined direction. Accordingly, the LC twist angle in cell 140 is 0° (also named untwisted). The untwisted LC cell 140 is optically equal to a retarder with its fast axis along the predetermined alignment direction and the retardation of the incident light is $2\pi\cdot\Delta n\cdot d/\lambda$. Particularly, for the wavelengths of $4\cdot\Delta n\cdot d/(4m+1)$, where m=0, 1, 2, . . . , LC cell 140 optically behaves as a quarter wavelength retarder, which change the circularly polarized incident light at the above wavelengths to the 45° or 135° linearly polarized light after the light passes untwisted LC cell 140.

In LC cell 160, an electric field is added to the LC cell through patterned ITO electrodes 162 and 166 and the LC molecules are aligned with their long molecular axes being along the direction of the applied electric field. The LC cell 160 is optically equal to a neutral density filter (i.e., an optical device which equally attenuates the orthogonal polarization components of the incident light and has no birefringence).

Figure 2:
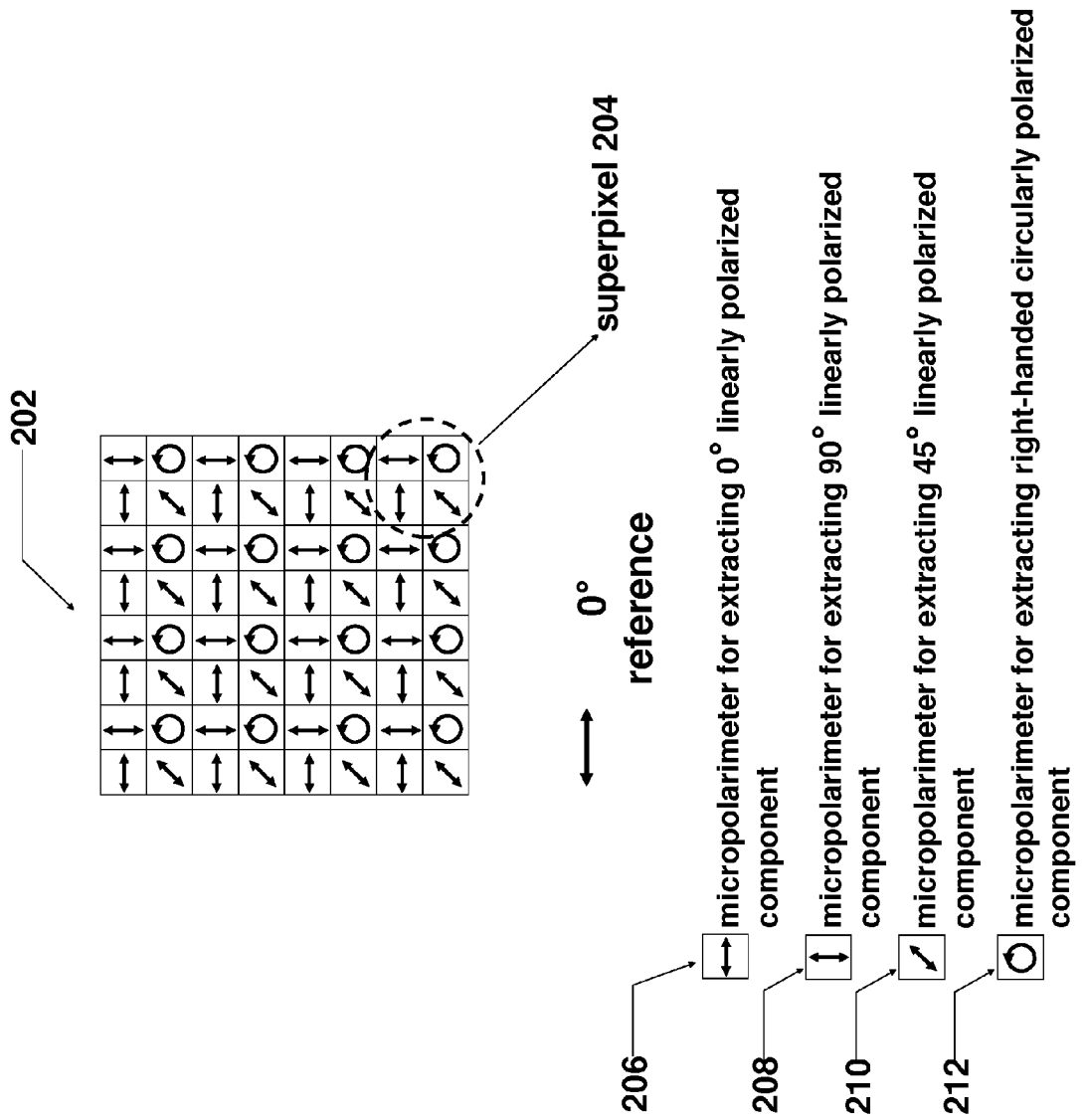
FIG. 2 shows a view of the liquid-crystal micropolarimeter array for simultaneous extraction of complete polarization information defined by the four Stokes parameters.

Structure of the Micropolarimeter Array for Complete Polarimetries of Incident Light FIG. 2 illustrates one embodiment of a micropolarimeter array 202 for simultaneously extracting full Stokes parameters of the incident light with arbitrary polarization state. The micropolarimeter array 202 includes at least one superpixel 204, which includes four micropolarimeters (i.e., 206, 208, 210, and 212) for analyzing 0°, 90°, 45° linearly polarized and right-handed circularly polarized components of the incident light. These micropolarimeters have structures similar to those shown in FIG. 1.

Figure 3:
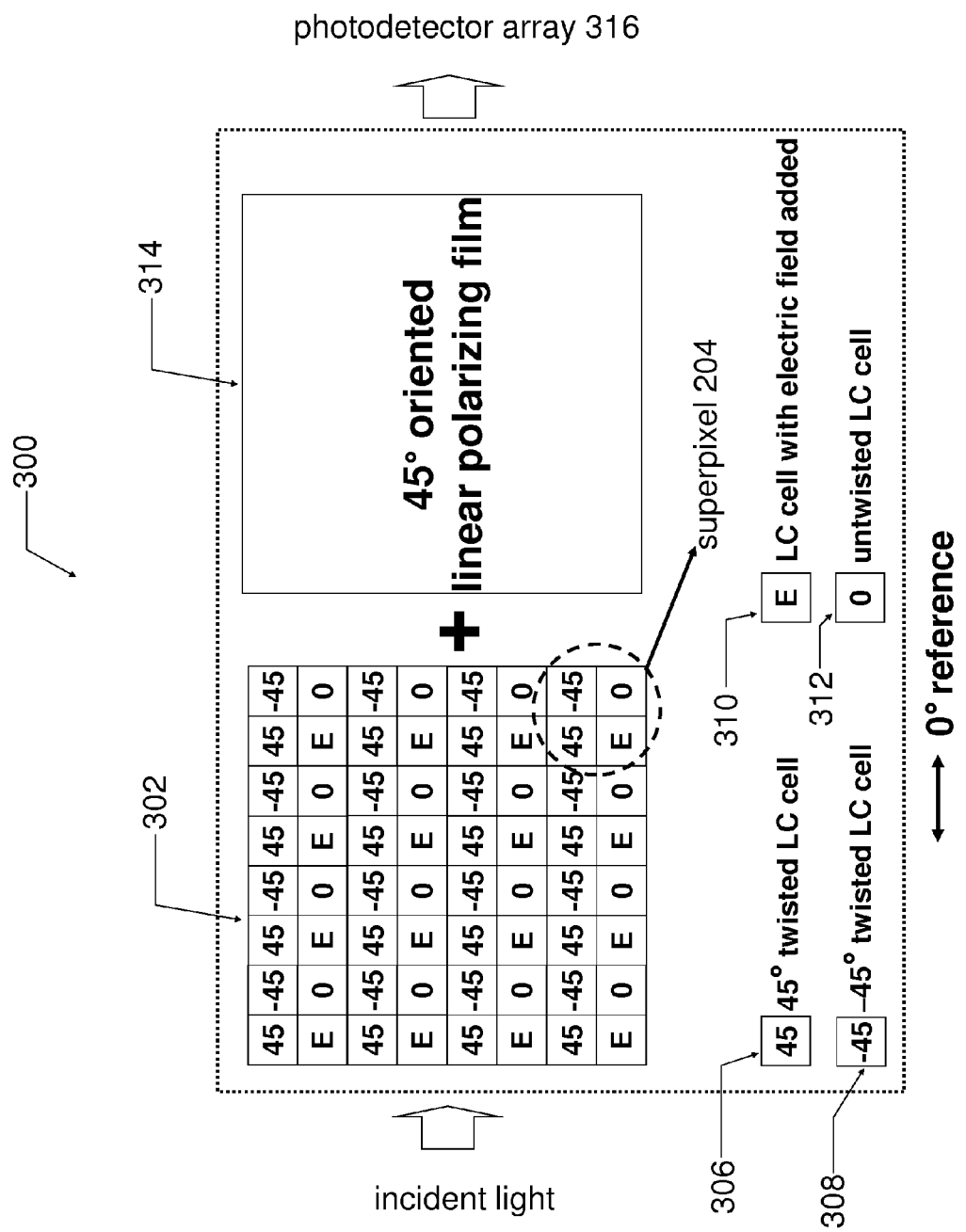
FIG. 3 shows a another view of the liquid-crystal micropolarimeter array having a layer of micrometer-scale photo-aligned LC cells and a 45° oriented linear polarizing film.

FIG. 3 shows a further embodiment of the micropolarimeter array 202, which includes a layer of micrometer-scale photo-aligned LC cells 202, a 45 linear polarizing film 214 and a photodetector array 216.

Figure 4:
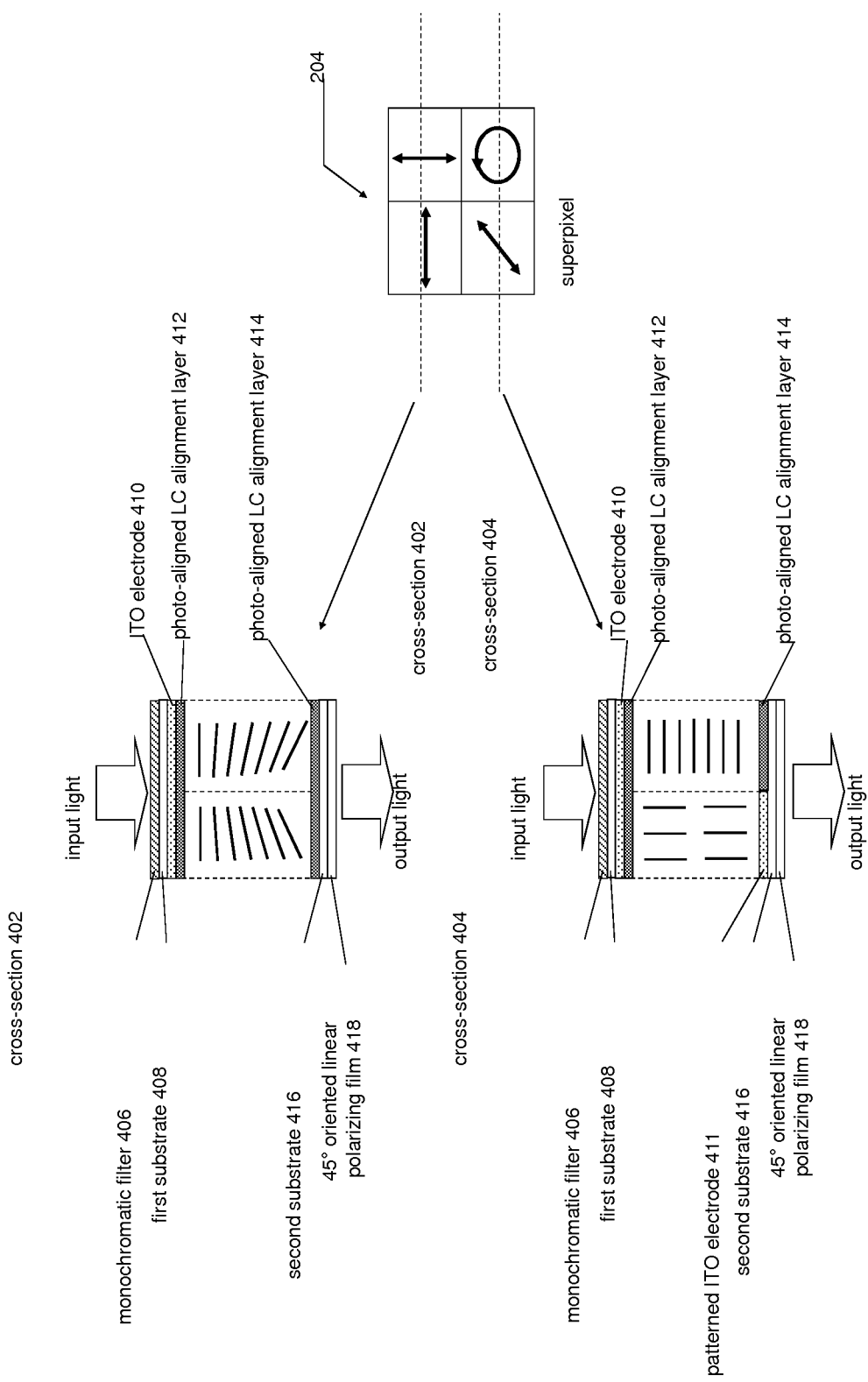
FIG. 4 shows a side view of a pixel element of the liquid-crystal micropolarimeter array and its cross-section view.

FIG. 4 depicts two cross-sections of superpixel 204 shown in FIGS. 2 and 3. Within each superpixel 204, the four micropolarimeters 206, 208, 210, and 212 with different LC molecules alignments are arranged on top of the 45° oriented linear polarizing film 418. As discussed above, the four micropolarimeter LC cells are optically equivalent to a 45° polarization rotator, a –45° (or 135°) polarization rotator, a quarter wavelength retarder (for wavelengths of interest) and a neutral density filter, respectively. Combining the 45° oriented linear polarizing film 418, the four micropolarimeters optically behave as 0°, 90°, and 45° linear polarization analyzers and a right-handed circular polarization analyzer, respectively, as shown in FIG. 2.

Figure 5:
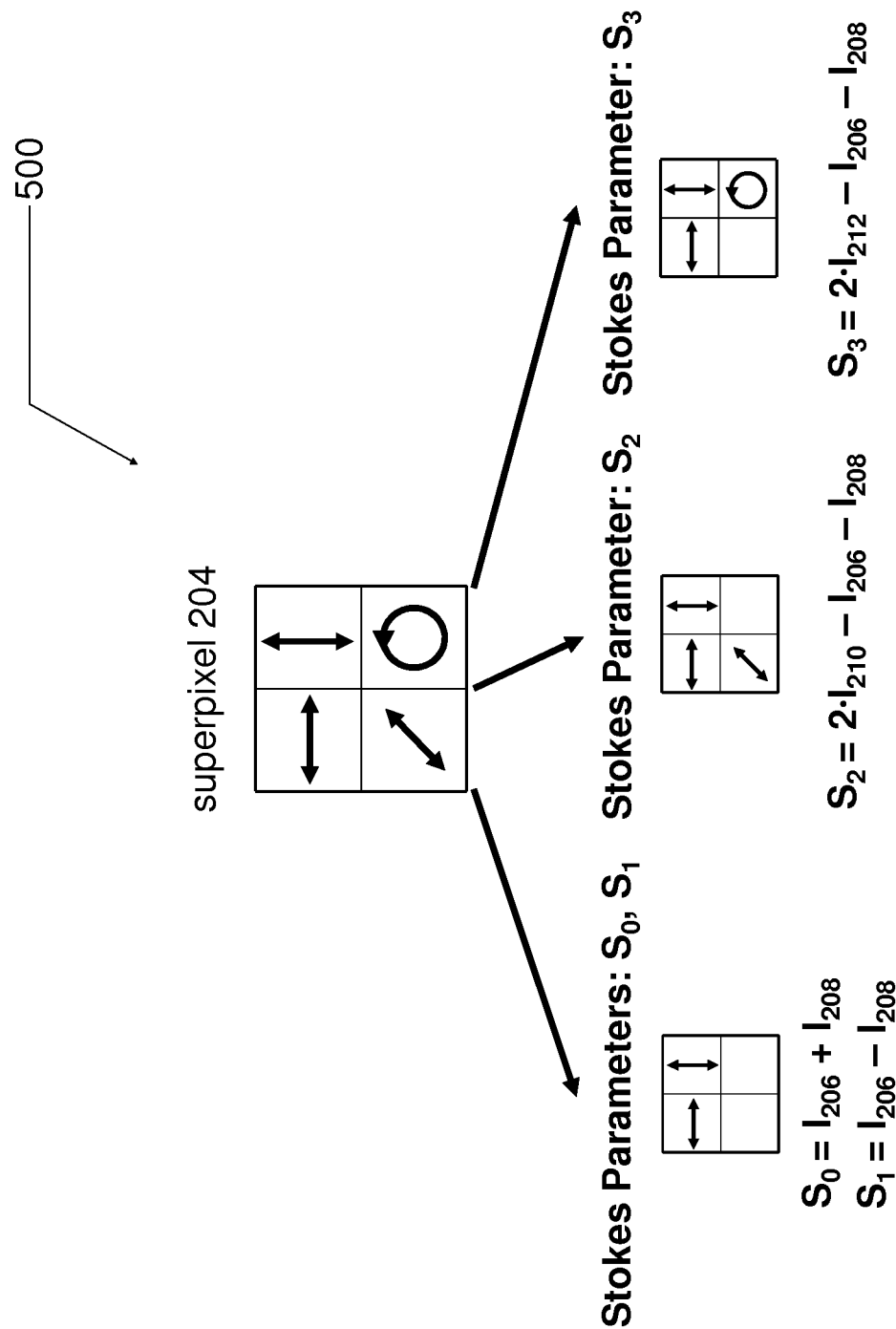
FIG. 5 shows an extraction of Stokes parameters with different combinations of micropolarimeters in a superpixel.

FIG. 5 shows a view of four photodetectors used to sense the emerging light intensities after the incident light passes the four micropolarimeters, which extract the Stokes parameters I(0°,0°), I(90°,0°), I(45°,0°) and I(45°,90°), respectively. According to the intensity expression of Stokes parameters, real-time simultaneous extraction of full Stokes parameters is enabled with photocurrent readout and processing circuitries, where the photocurrent of the output of the photodetector is proportional to the emerging light intensity, which represent the intensity of the Stokes parameters.

Figure 8:
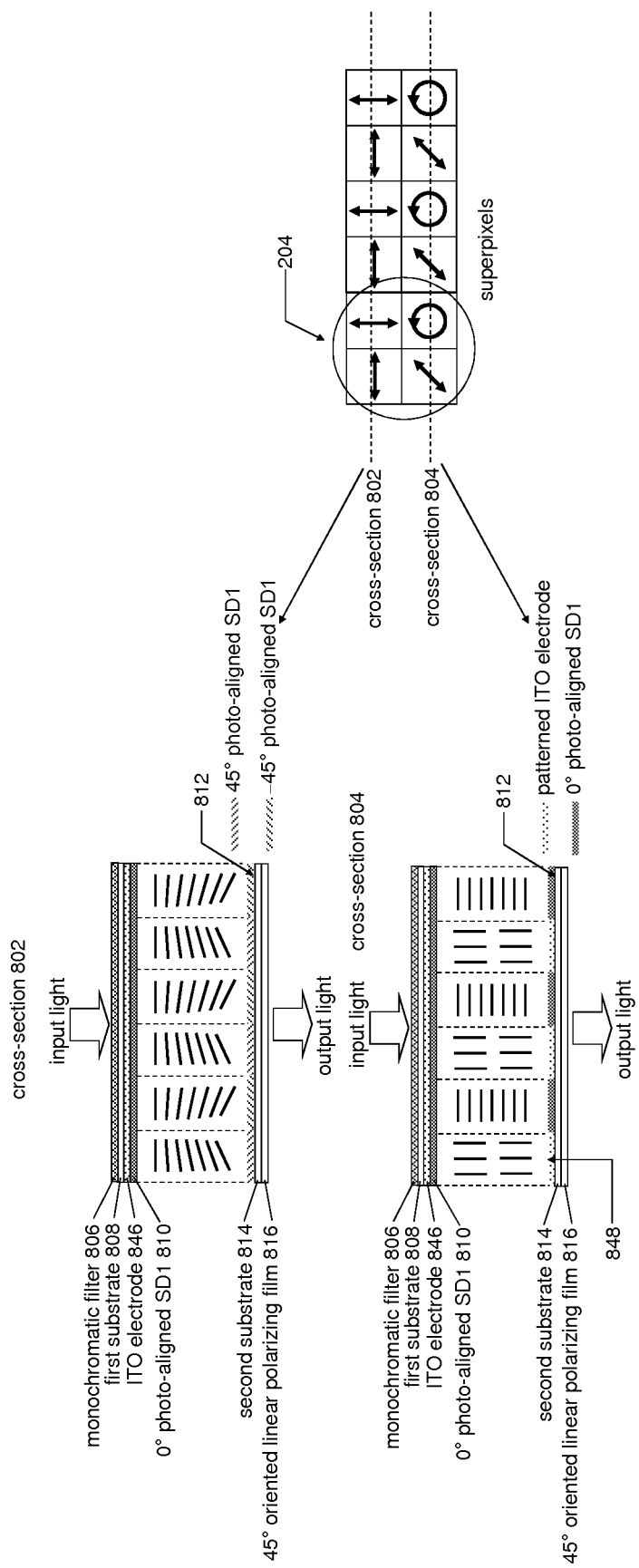
FIG. 8 shows a cross-section view of the micropolarimeter array superpixels having arbitrary first and second substrates.

Micropolarimeter Array Fabrication with Glass Slides as the First and Second Substrates FIG. 8 depicts the cross-sections of the superpixel 204, where two transparent thin glass slides are used as a first substrate 808 having an inner and an outer surface and a second substrate 814 having an inner and an outer surface, respectively. Detailed fabrication steps are outlined in FIG. 11 and further described as follows. Here the substrates and the layers disposed thereon can also be collectively referred to as "alignment layers."

At blocks 1102 and 1104, first and second alignment layers are formed. In particular, an ITO layer is disposed on top of the inner surfaces of both the first and the second substrates as shown in FIG.

Figure 7:
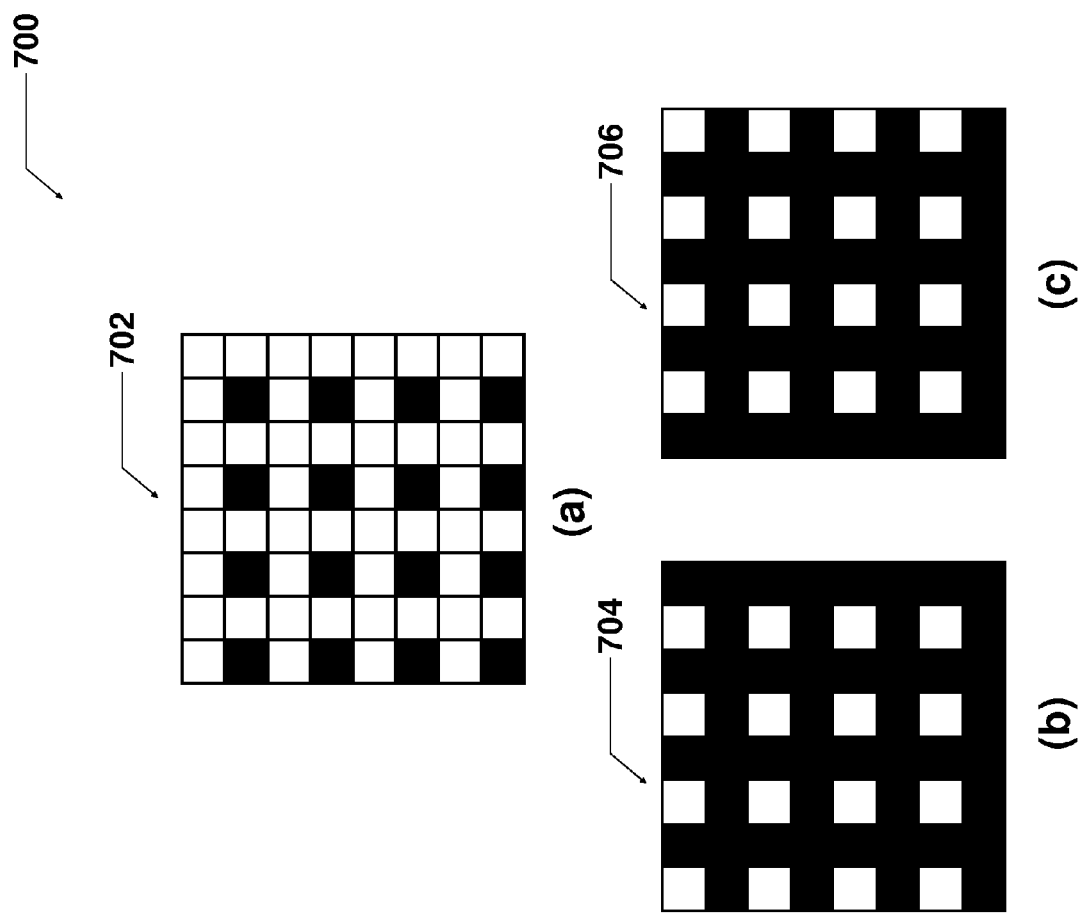
FIG. 7 shows (a) the photolithography mask used to pattern the ITO electrodes of the LC cells with the LC molecules arrangement shown in FIG. 1 (d), (b) the photolithography mask used to photo-align the alignment layers of the LC cells with the LC molecules arrangement shown in FIGS. 1 (a), and (c) the photolithography mask used to photo-align the alignment layers of the LC cells with the LC molecules arrangement shown in FIG. 1 (b)

In addition, the ITO layer of the second substrate is selectively etched in according with the sub-pixel pattern. In particular, a photolithography mask 703 as shown in FIG. 7 (a) is applied onto the ITO layer as the etching process is performed. During the etching process, The portion of the ITO layer covered by the black blocks of the mask 703 remained intact, while the remainders of the ITO layer are etched away. The remaining ITO regions then form the electrodes 411 for the LC cells shown in FIG. 3.

The inner surfaces of the two substrates are then cleaned by using an ultraviolet-ozone (UVO) cleaner for 20 minutes to remove organic contaminants and improve the spin coat uniformity of the LC alignment layers 810 and 812.

Figure 6:
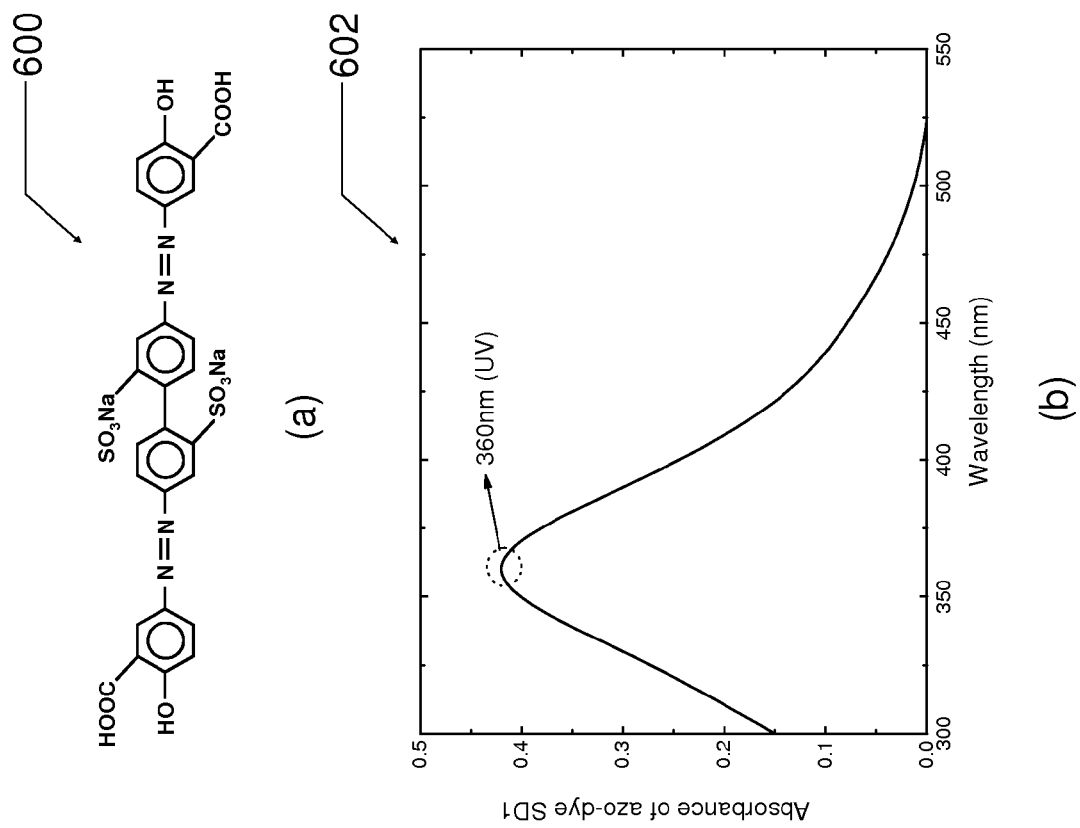
FIG. 6 shows (a) the chemical formula of the sulfonic azo-dye (SD1) and (b) the absorption spectrum of the sulfonic azo-dye (SD1)

With respect to the LC alignment layers, a SD1 solution is spin coated onto the inner surfaces of the two substrates at 800 rpm for 10 s then 3000 rpm for 40 s. In order to eliminate the particle impurities, the solution of SD1 in dimethylformamide (DMF) with a concentration of 1% by weight is filed before the spin coating. The molecule structure of SD1 is depicted in FIG. 6($a$). The substrates are then baked at 110° C. for 20 minutes to remove the remaining solvent and strengthen the adhesion of the SD1 material to the substrates. This layer of SD1 material can also be called photoalignment layer.

The inner surfaces of the two substrates with the SD1 coated are then exposed to 90° linearly polarized UV light for 15 min without mask applied, resulting a 0° photoalignment of the SD1 molecules.

Subsequently, inner surface of the second substrate with the SD1 material is exposed to −45° linearly polarized UV light for 15 min with a photolithography mask shown in FIG. 7 ($b$) applied to the surface of the substrate, thereby resulting in a 45° reorientation of the SD1 molecules within the exposed regions (indicated by the white blocks in FIG. 7($b$)). These regions then form the alignment layer 104 for the 45° twisted LC cells 100 shown in FIG. 1($a$).

The inner surface of the second substrate with the SD1 material is then exposed to 45° linearly polarized UV light for 15 min with the photolithography mask shown FIG. 7 ($c$), thereby resulting in a −45° reorientation of the SD1 molecules within the exposed regions (indicated by the white blocks in FIG. 7($c$)). These regions then form the alignment layer 124 for the −45° twisted LC cells 120 shown in FIG. 1($b$).

The remaining regions of the second substrate 416 then form the alignment layer 144 for the untwisted LC cells 140 shown in FIG. 1($c$).

At block 1106, the first and second alignment layers are aligned with each other. In particular, spacers are sprayed with diameter ranging from 5 μm to 20 μm on the inner surface of the second substrate. The two substrates are assembled with the inner surfaces facing each other and a space residing between the two inner surfaces;

At block 1108, the LC material, which has a predetermined birefringence Δn as defined above, is filled between the two substrates.

A polarizing film 816 is then laminated on the outer surface of the second substrate 814 with the polarizing axis along 45°.

Finally, a monochromatic filter 806 is mounted on the outer surface of the first substrate 808 to provide monochromatic incident light, for which the untwisted LC cells with the micropolarimeter are optically equal to quarter wavelength retarders.

Figure 9:
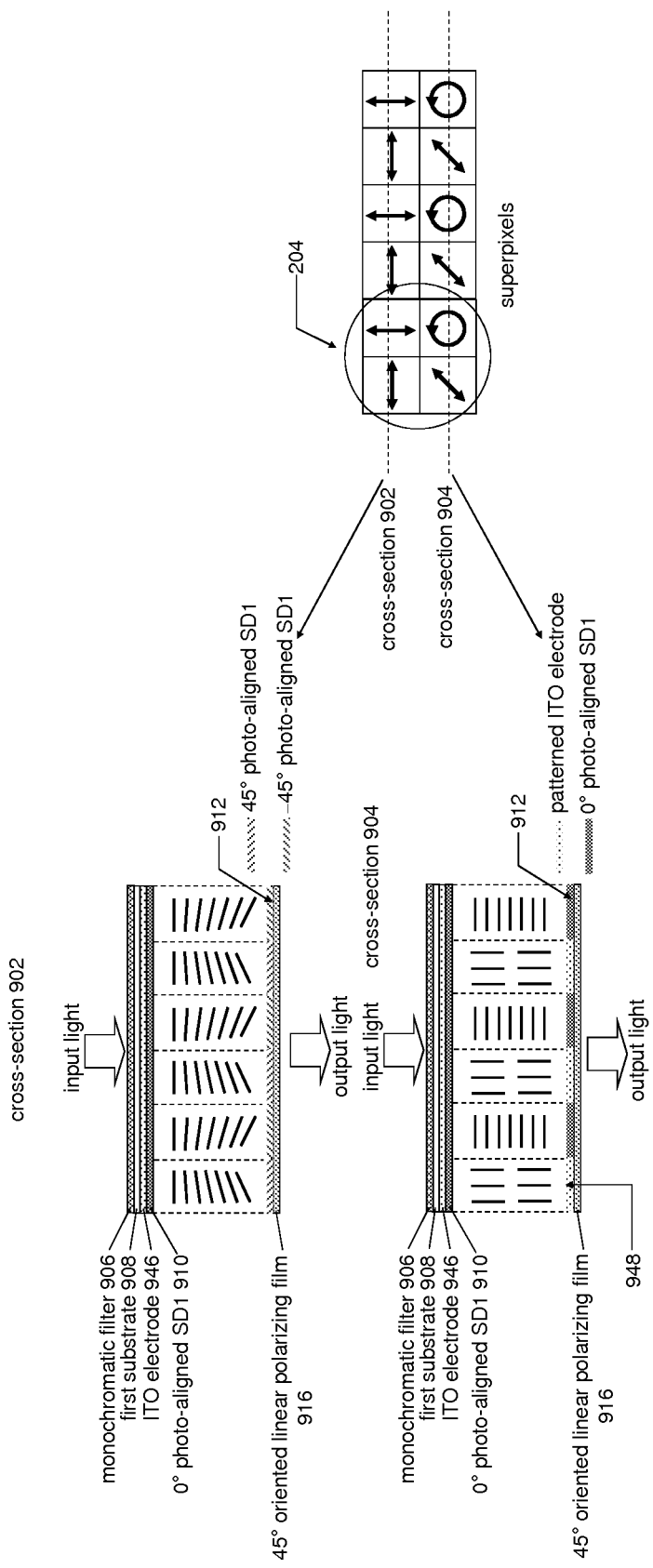
FIG. 9 shows a cross-section view of the micropolarimeter array superpixels having a 45° oriented linear polarizing film as the second substrate.

Micropolarimeter Array Fabrication with a Linear Polarizing Film as the Second Substrate FIG. 9 shows another embodiment of the micropolarimeter where a polarizing film having an inner and an outer surface with it polarizing axis orientation along 45° is used as the second substrate 914 and a transparent thin glass slide is used as the first substrate 908 having an inner and an outer surface.

Figure 11:
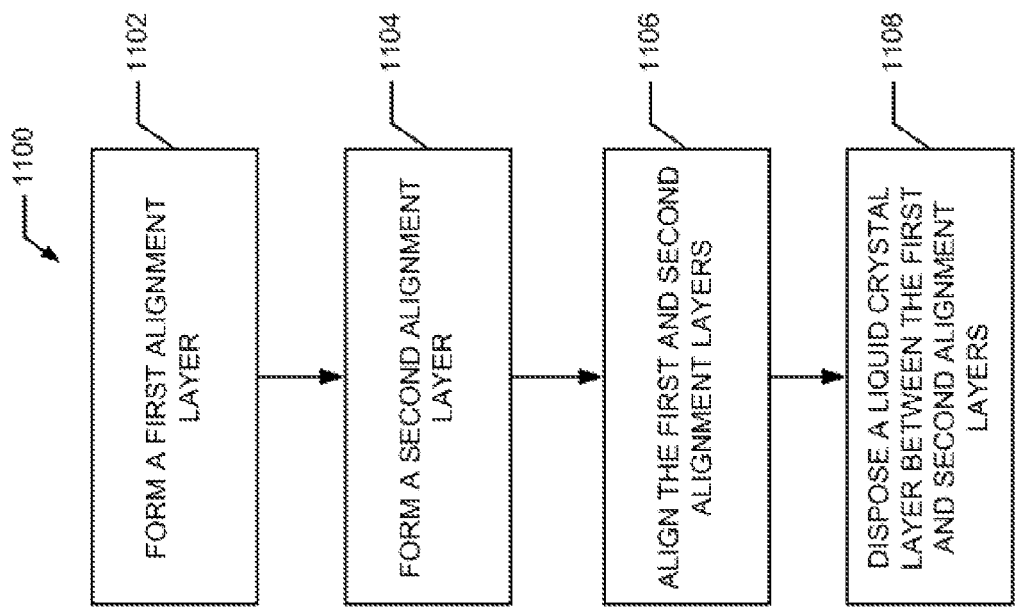
FIG. 11 illustrates the process for manufacturing the micropolarimeters shown in FIGS. 8, 9, and 10.

The micropolarimeter shown in FIG. 9 advantageously has a thinner structure and a simpler fabrication process. Detailed fabrication process, which is similar to that shown in FIG. 11, is outlined as below.

In particular, an ITO layer is disposed on top of the inner surfaces of both the first and the second substrates. The ITO layer of the second substrate (i.e., the 45 degree polarizing film 914) is etched by applying the photolithography mask shown in FIG. 7 ($a$). The remaining ITO regions form the electrodes 948 for the LC cells 160 where the electric field is added through the electrode.

The inner surfaces of the two substrates 908 and 916 are then cleaned with an ultraviolet-ozone (UVO) cleaner for 20 minutes to remove organic contaminants and improve the spin coat uniformity of the LC orientation material.

The SD1 solution described above is the spin coated on the ITO electrode layer 946 of the first substrate 908 and the inner surface of the polarizing film 916 at 800 rpm for 10 seconds then 3000 rpm for 40 seconds.

The first substrate 908 is then baked at 110° C. for 20 minutes and the polarizing film 916 is baked at 50° C. for 20 minutes to remove the remaining solvent and strengthen the adhesion of the SD1 layer to the two substrates.

The inner surfaces of said two substrates with the SD1 layer are then exposed to 90° linearly polarized UV light for 15 minutes without mask applied, resulting in a 0° photoalignment of the SD1 molecules.

Subsequently, the inner surface of the second substrate 916 with the SD1 layer is then exposed to −45° linearly polarized UV light for 15 minutes with the photolithography mask shown in FIG. 7 ($b$), resulting a 45° reorientation of the SD1 molecules in these exposed regions (indicated by white blocks in FIG. 7($b$)). These regions form the alignment layer 104 for the 45 degree twisted LC cell 100 shown in FIG. 1($a$).

The inner surface of the second substrate 916 is then exposed to 45° linearly polarized UV light for 15 minutes with the photolithography mask shown in FIG. 7 ($c$) applied, resulting in a −45° reorientation of the SD1 molecules in the exposed regions (indicated by white blocks in FIG. 7($c$)). These regions form the alignment layer 124 for the −45 degree twisted LC cell 120 shown in FIG. 1($b$). The remainders of the second substrate 916 which has the SD1 materials the form the alignment layer 144 for the untwisted LC cells 140 shown in FIG. 1($c$).

Spacers with diameter ranging from 5 μm to 20 μm are then sprayed on the inner surface of the second substrate 914. The two substrates together with the layers are assembled with the inner surfaces facing each other and a space between the inner surfaces. The space is then filled with LC materials with the predetermined birefringence Δn described above.

A monochromatic filter is then mounted onto the outer surface of the first substrate to provide monochromatic incident light, for which the untwisted LC cell (e.g., cell 140 in FIG. 1($c$)) become an optical equivalent of a quarter wavelength retarders.

Micropolarimeter Array Directly Fabricated on Top of Solid-State Image Sensor

Figure 10:
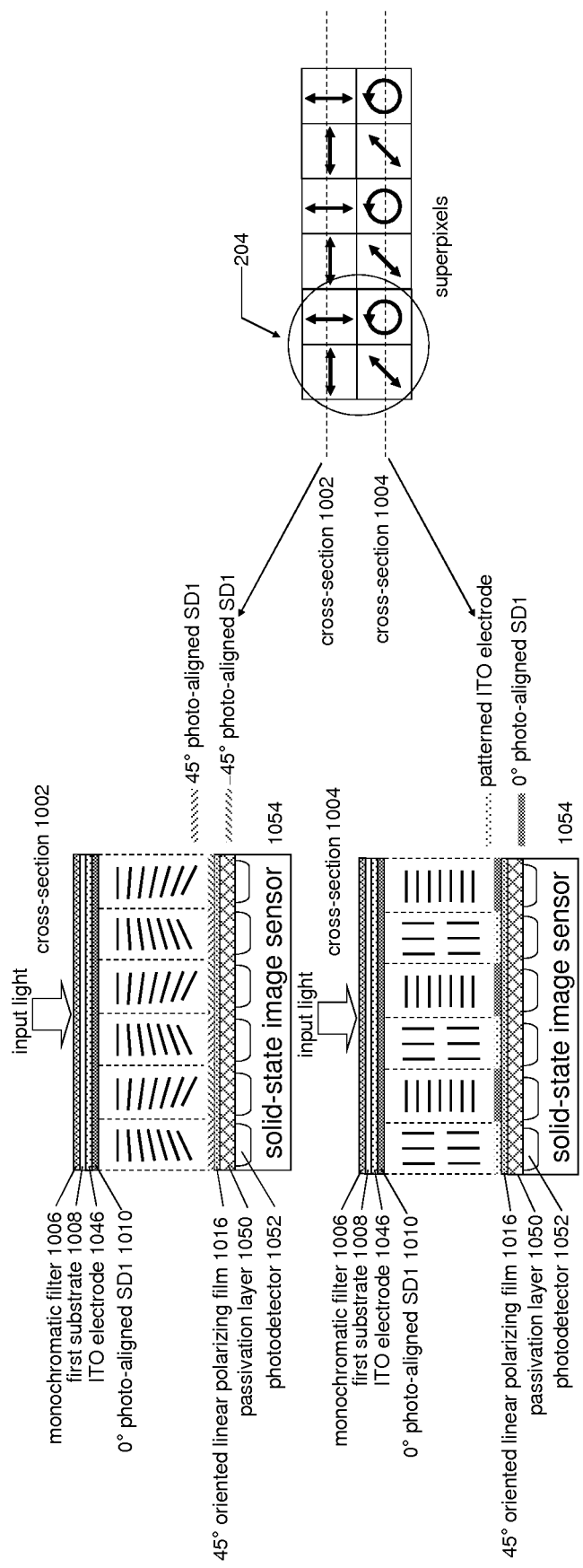
FIG. 10 shows a cross-section view of the micropolarimeter array directly fabricated on top of an image sensor.

FIG. 10 depicts another embodiment of the micropolarimeter, which is directly fabricated on top of a solid-state image sensor 1054. The micropolarimeter fabricated as such enable real-time polarization imaging. As illustrated in FIG. 10, a transparent thin glass slide is used as the first substrate 1008 having an inner and an outer surface. A polarizing film 1016 having an inner and an outer surface is laminated on the passivation layer 1050 of the solid-state image sensor 1054 with its outer surface facing the passivation layer 1050 and its polarizing axis along 45°. The polarizing film 1016 together with the solid-state image sensor 1054 form the second substrate with the inner surface of the polarizing film 1016 being the inner surface of the second substrate. The fabrication steps of this micropolarimeter are similar to those shown in FIGS. 8 and 9. In a further embodiment, the solid-state image sensor 1054 is complementary metal-oxide-semiconductor (CMOS) image sensor or charge coupled device (CCD) image sensor.

One skilled in the art would appreciate that each superpixel 204 described above can include 3 or more sub-pixels for providing similar functionalities and the sub-pixels can be arranged in other predetermined patterns, such as along a line rather than in a 2×2 grid as shown in the drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus for measuring polarization components of incident light, including:
   a micropolarimeter pixel array having a plurality of pixels, wherein each pixel provides substantially simultaneous measurements of three or more polarization components of the incident light, wherein the three or more polarization components include a circularly or elliptically polarized component of the incident light.

2. The apparatus of claim 1, wherein each pixel includes three or more sub-pixels and each of the three or more sub-pixels measures one of the three or more polarization components of the incident light.

3. The apparatus of claim 1, wherein the three or more polarization components of the incident light include a 0 degree polarized component, a 45 degree polarized component, a 90 degree polarized component, and at least one of a right-handed circularly or elliptically polarized component and a left-handed circularly or elliptically polarized component.

4. The apparatus of claim 3, wherein each pixel includes four sub-pixels, and each of the sub-pixels is configured to measure a different polarization component of the incident light.

5. An apparatus for measuring polarization components of incident light, including:
   a first alignment layer for receiving the incident light having one or more polarization components, the first alignment layer having a first photoalignment direction;
   a second alignment layer aligned with the first alignment layer for outputting retarded light, the second alignment layer having three or more regions arranged in a predetermined pattern, wherein each of the three or more regions has a second-photoalignment direction different from the second-photoalignment directions of the other regions of the second alignment layer; and
   a liquid crystal layer disposed between the first and second alignment layers and aligned by the first and second alignment layers in accordance with the first and second photoalignment directions, wherein the liquid crystal layer imparts different retardations to the incident light so that the retarded light output from each of three or more regions of the second alignment layer has a different polarization component of the incident light, including a circularly or elliptically polarized component of the incident light.

6. The apparatus of claim 5, wherein the first alignment layer includes a first substrate layer, a first electrode layer, and a first photoalignment layer, wherein the first electrode layer is disposed between the first substrate layer and a first surface of the first photoalignment layer, and wherein the liquid crystal layer is disposed on a second surface of the first photoalignment layer.

7. The apparatus of claim 5, wherein the second alignment layer includes a second substrate layer, a second electrode layer, and a second photoalignment layer, wherein the second electrode layer and the second photoalignment layer are disposed on the second substrate and interlaced in accordance with the predetermined pattern without overlapping each other, and wherein the liquid crystal layer is disposed on the interlaced second electrode and second photoalignment layers.

8. The apparatus of claim 5, further including an unpatterned polarized film disposed on an outer surface of the second alignment layer.

9. The apparatus of claim 8, further including an image sensor, wherein the polarized film is laminated on the image sensor, and wherein the three or more regions of the second alignment layer are aligned with a pixel of the image sensor.

10. The apparatus of claim 9, wherein the polarized film has a polarization direction oriented 45 degree with respect to the first photoalignment direction.

11. The apparatus of claim 5, wherein the retarded light output from the second set of three or more regions of the second alignment layer includes at least three of a 0 degree polarized component, a 45 degree polarized component, a 90 degree polarized component, a right-handed circularly or elliptically polarized component, and a left-handed circularly or elliptically polarized component.

12. The apparatus of claim 5, wherein each of the second photoalignment directions of the second alignment layer is oriented with respect to the first photoalignment direction of the first alignment layer at an angle of 0 degree, 45 degree, 135 degree, or 90 degree.

13. The apparatus of claim 7, wherein the first alignment layer includes a first electrode layer, and wherein the first and second electrode layers apply an electric field having an electric alignment direction to a portion of the liquid crystal layer corresponding to the region occupied by the second electrode layer, so as to cause a long molecular axes of the liquid crystal layer aligned with the electric alignment direction of the electric field.

14. The apparatus of claim 7, wherein the second alignment layer has four regions arranged in a 2 by 2 grid, wherein one of the four regions is filled with the second electrode layer and the other three of the four regions are filled with the second photoalignment layer, and wherein each of the three regions filled with the second photoalignment layer has a second photoalignment direction different from the second photoalignment directions of the other two regions filled with the second photoalignment layer, and the second photoalignment direction of each region filled with the second photoalignment layer is oriented with respect to the first photoalignment direction at an angle of 0 degree, 45 degree, 135 degree, or 90 degree.

15. An apparatus for measuring polarization components of incident light, including:
- a first alignment layer for receiving the incident light having one or more polarization components, the first alignment layer having a first photoalignment direction;
- a second alignment layer aligned with the first alignment layer for outputting retarded light, the second alignment layer having three or more regions arranged in a predetermined pattern, wherein each of the three or more regions has a second-photoalignment direction different from the second-photoalignment directions of the other regions of the second alignment layer; and
- a liquid crystal layer disposed between the first and second alignment layers and aligned by the first and second alignment layers in accordance with the first and second photoalignment directions, wherein the liquid crystal layer imparts different retardations to the incident light so that the retarded light output from each of three or more regions of the second alignment layer has a different polarization component of the incident light;
- wherein the second alignment layer includes a second substrate layer, a second electrode layer, and a second photoalignment layer, wherein the second electrode layer and the second photoalignment layer are disposed on the second substrate and interlaced in accordance with the predetermined pattern without overlapping each other, and wherein the liquid crystal layer is disposed on the interlaced second electrode and second photoalignment layers.

* * * * *